(12) United States Patent
Yoon

(10) Patent No.: US 10,480,673 B2
(45) Date of Patent: Nov. 19, 2019

(54) SOLENOID VALVE FOR BRAKE SYSTEM

(71) Applicant: MANDO CORPORATION, Pyeongtaek-si, Gyeonggi-do (KR)

(72) Inventor: An-Soo Yoon, Suwon-si (KR)

(73) Assignee: MANDO CORPORATION, Pyeongtaek-si, Gyeonggi-Do (KR)

(*) Notice: Subject to any disclaimer, the term of this patent is extended or adjusted under 35 U.S.C. 154(b) by 0 days.

(21) Appl. No.: 15/923,605

(22) Filed: Mar. 16, 2018

(65) Prior Publication Data
US 2018/0266582 A1 Sep. 20, 2018

(30) Foreign Application Priority Data

Mar. 16, 2017 (KR) .......................... 10-2017-0033100

(51) Int. Cl.
*F16K 31/06* (2006.01)
*B01D 29/56* (2006.01)
(Continued)

(52) U.S. Cl.
CPC .......... *F16K 31/0665* (2013.01); *B01D 29/56* (2013.01); *B60T 8/363* (2013.01);
(Continued)

(58) Field of Classification Search
CPC ...... F16K 31/0665; F16K 15/00; F16K 31/06; F16K 27/029; B01D 29/56; B60T 8/363;
(Continued)

(56) References Cited

U.S. PATENT DOCUMENTS 6,364,430 B1 * 4/2002 Park ........................ B60T 8/363
251/129.02
6,644,623 B1 * 11/2003 Voss ........................ B60T 8/363
251/129.01
(Continued)

FOREIGN PATENT DOCUMENTS

KR     2000-0035323 A    6/2000
KR 10-2013-0066381 A    6/2013
(Continued)

OTHER PUBLICATIONS

Korean Office Action dated Jun. 19, 2018 in connection with the counterpart Korean Patent Application No. 10-2017-0033100, citing the above reference(s).

*Primary Examiner* — Pamela Rodriguez
(74) *Attorney, Agent, or Firm* — Hauptman Ham, LLP

(57) ABSTRACT

The solenoid valve according to the embodiment of the present disclosure includes a filter member accommodated in a bore of a modulator block, a valve seat including an orifice, and a plunger configured to open and close the orifice, wherein the boss in which a connecting path is formed is inserted into the valve seat located at a center of the filter member, a plunger valve configured to be vertically moved due to a pressure of supplied oil and including a vertical hole formed to pass through a center of the plunger valve is disposed below the connecting path, and a plunger valve seat having a diameter greater than that of the connecting path is provided at a lower portion of the connecting path to selectively come into contact with an outer surface of the plunger valve when the plunger valve is moved upward.

10 Claims, 3 Drawing Sheets

(51) Int. Cl.
  *B60T 8/36* (2006.01)
  *B60T 13/68* (2006.01)
  *B60T 13/66* (2006.01)
  *B60T 17/00* (2006.01)
  *F16K 27/02* (2006.01)

(52) U.S. Cl.
  CPC .......... *B60T 13/662* (2013.01); *B60T 13/686* (2013.01); *B60T 17/004* (2013.01); *F16K 27/029* (2013.01)

(58) Field of Classification Search
  CPC ...... B60T 8/365; B60T 13/146; B60T 13/662; B60T 13/686; B60T 17/004; B60T 15/028
  USPC ................ 303/119.2, 119.1, 119.3; 137/598, 137/599.11, 601.14, 601.2, 884; 251/129.02, 129.15
  See application file for complete search history.

(56) References Cited

U.S. PATENT DOCUMENTS

| | | | | |
|---|---|---|---|---|
| 6,846,049 | B2* | 1/2005 | Obersteiner | B60T 8/363 137/596.17 |
| 7,862,130 | B2* | 1/2011 | Lee | B60T 8/363 251/129.02 |
| 9,623,854 | B2* | 4/2017 | Jeon | B60T 13/146 |
| 2009/0121541 | A1* | 5/2009 | Lee | B60T 8/363 303/119.2 |
| 2010/0059698 | A1* | 3/2010 | Guggenmos | B60T 8/363 251/129.15 |
| 2010/0264342 | A1* | 10/2010 | Heyer | B60T 8/363 251/129.15 |

FOREIGN PATENT DOCUMENTS

| | | |
|---|---|---|
| KR | 10-1536190 B1 | 7/2015 |
| KR | 10-2015-0118210 A | 10/2015 |

* cited by examiner

SOLENOID VALVE FOR BRAKE SYSTEM

CROSS-REFERENCE TO RELATED APPLICATION

This application claims the benefit of Korean Patent Application No. 2017-0033100, filed on Mar. 16, 2017 in the Korean Intellectual Property Office, the disclosure of which is incorporated herein by reference.

BACKGROUND

1. Field

Embodiments of the present disclosure relate to a solenoid valve for a brake system, and more particularly, to a solenoid valve for a brake system in which responsiveness is improved during braking.

2. Description of the Related Art

A hydraulic brake system for braking is necessarily installed in a vehicle, and recently, several types of systems have been proposed to obtain a more powerful and stable braking force. As examples of hydraulic brake systems, there are an anti-lock brake system (ABS) configured to prevent slide of a wheel during braking, a brake traction control system (BTCS) configured to prevent slip of a driving wheel during sudden unintended acceleration or sudden acceleration of a vehicle, a vehicle electronic stability control (ESC) in which the ABS and the BTCS are combined to control a hydraulic pressure of a brake to stably maintain a traveling state of a vehicle, and the like.

Meanwhile, in the case of the ESC, transmission of a predetermined amount of oil is needed to perform braking and release the braking, and a plurality of electronically-controlled solenoid valves are installed in a modulator block in order to realize the ESC.

The amount of oil needed during braking relates to braking responsiveness of a vehicle, and particularly, a large vehicle needs a large amount of flow rate. Accordingly, structures for increasing flow paths for ensuring an amount of oil configured to pass through solenoid valves have been continuously studied.

RELATED ART DOCUMENT

Patent Document

Korea Patent No. 1536190 (Jul. 30, 2015)

SUMMARY

Therefore, it is an aspect of the present disclosure to provide a solenoid valve for a brake system in which braking responsiveness is improved.

Additional aspects of the disclosure will be set forth in part in the description which follows and, in part, will be obvious from the description, or may be learned by practice of the disclosure.

In accordance with one aspect of the present disclosure, a solenoid valve for a brake system includes a filter member accommodated in a bore of a modulator block including an inlet path and a discharge path, a magnet core coupled to the filter member and including a through hole longitudinally passing through the magnet core, a sleeve coupled to an outer surface of the magnet core, an armature installed in the sleeve, a valve seat fixed to the through hole and including an orifice, a plunger disposed at the through hole to open and close the orifice while vertically being moved by movement of the armature, and a returning spring configured to press the plunger against the armature, wherein a boss inserted into the valve seat through an opening of a lower end of the filter member and including a connecting path configured to cause the orifice to communicate with the discharge path is formed to pass through a center of the filter member, a plunger valve vertically moved due to a pressure of supplied oil and including a vertical hole formed to pass through a center of the plunger valve is disposed below the connecting path, and a plunger valve seat having a diameter greater than that of the connecting path is provided at a lower end of the connecting path to selectively come into contact with an outer surface of the plunger valve when the plunger valve vertically moves.

A width of the plunger valve seat gradually may increase in a downward direction.

The plunger valve seat may have a size to accommodate the plunger valve and a corn shape including a horizontal surface horizontally extending from a lower end of the connecting path and an inclined surface inclined downward from an edge of the horizontal surface.

The plunger valve may include a sealing portion formed in a hemisphere shape and configured to come into contract with the inclined surface when being moved upward and have a cross section having an arch shape.

When the plunger valve is moved downward and separated from the plunger valve seat, the oil may be allowed to flow through a gap between the plunger valve and the plunger valve seat and the vertical hole.

When the plunger valve is moved upward and comes into contact with the plunger valve seat, the oil may be allowed to flow through only the vertical hole.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
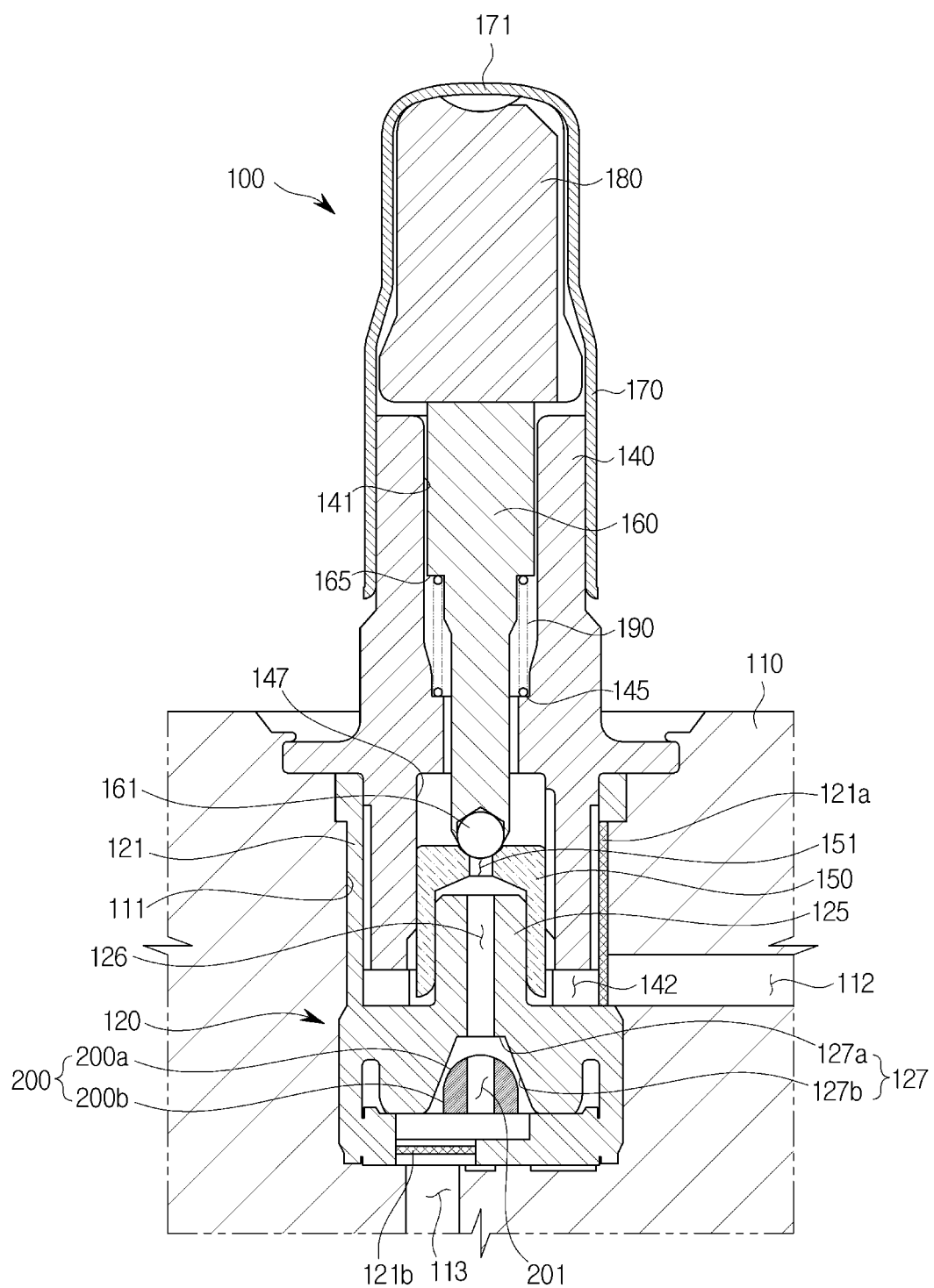
FIG. 1 is a cross-sectional view illustrating a solenoid valve for a brake system according to an embodiment of the present disclosure.

Hereinafter, embodiments of the present disclosure will be described in detail with reference to the accompanying drawings. The embodiments described below are provided as examples to fully convey the spirit of the present disclosure to those skilled in the art. The present disclosure is not limited to the embodiments described below and may also be implemented in other forms. Parts irrelevant to the description are omitted in the drawings in order to clearly explain the embodiments of the present disclosure, and widths, lengths, and thicknesses components illustrated in the accompanying drawings may be illustrated in an exaggerated way for the sake of convenience in the description.

Components that are the same are referred to by the same reference numerals in the specification.

Figure 2:
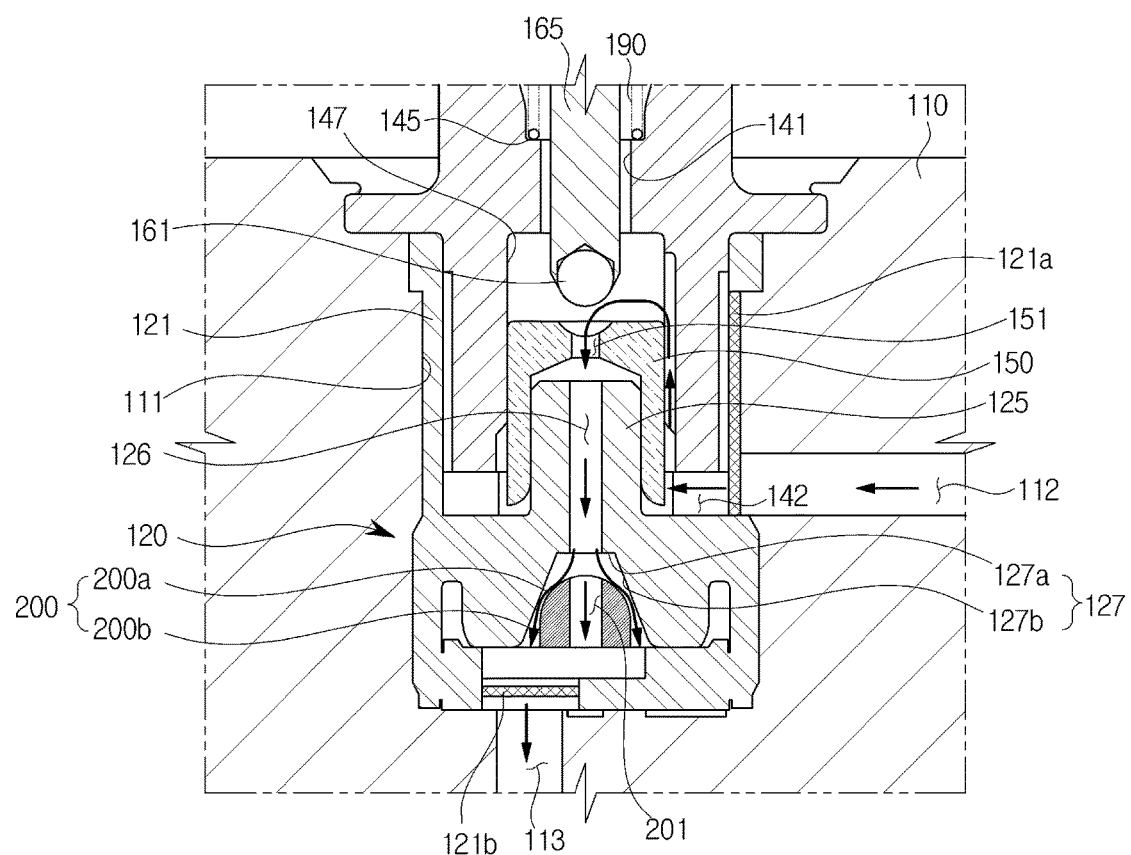
FIG. 2 is a view illustrating a flow of brake oil during braking of the solenoid valve for a brake system according to the embodiment of the present disclosure.
Figure 3:
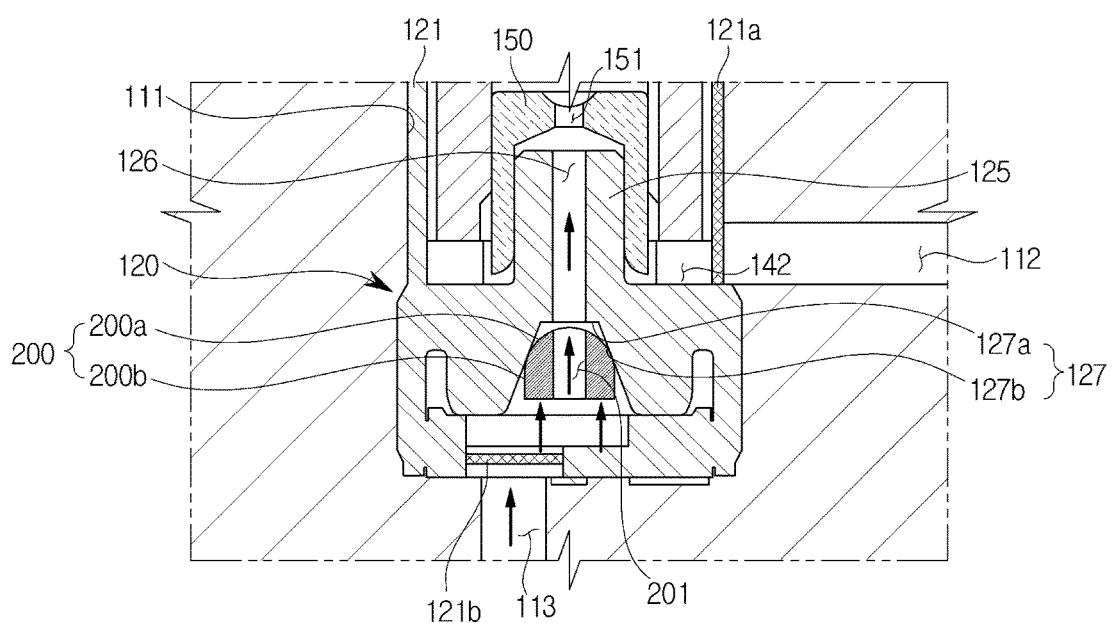
FIG. 3 is a view illustrating a flow of brake oil when the braking of the solenoid valve for a brake system according to the embodiment of the present disclosure is released.

FIG. 1 is a cross-sectional view illustrating a solenoid valve for a brake system according to an embodiment of the present disclosure, FIG. 2 is a view illustrating a flow of brake oil during braking of the solenoid valve for a brake system according to the embodiment of the present disclosure, and FIG. 3 is a view illustrating a flow of brake oil when the braking of the solenoid valve for a brake system according to the embodiment of the present disclosure is released.

Referring to FIGS. 1 to 3, a solenoid valve 100 for a brake system includes a filter member 120 accommodated in a bore 111 of a modulator block 110, a magnet core 140 coupled to the filter member 120, a valve seat 150 and a plunger 160 installed in the magnet core 140, a sleeve 170 coupled to an outer side of the magnet core 140, an armature 180 provided in the sleeve 170, a returning spring 190 configured to provide an elastic force to the plunger 160 toward the armature 180 and an exciter coil assembly (not shown) installed at an outside of the sleeve 170.

The magnet core 140 includes a through hole 141 longitudinally passing through the magnet core 140 and has a cylindrical form. A valve-seat installation portion 147 to which the valve seat 150 including an orifice 151 formed therein is fixedly fitted is formed in a lower interior portion of the through hole 141 of the magnet core 140. In addition, a spring support step 145 protruding to support a lower end of the returning spring 190 is provided on an inner circumferential surface of an upper side of the through hole 141 in the magnet core 140.

The valve seat 150 has an open lower end and an inside having a hollow-cylindrical form and is press fitted and coupled to the valve-seat installation portion 147 through an opening of a lower end of the valve-seat installation portion 147.

The orifice 151 formed to pass through a center of an upper end of the valve seat 150 is selectively opened and closed by an opening and closing part 161 of the plunger 160.

The filter member 120 is installed to enter the bore 111 of the modulator block 110 in a state in which the filter member 120 is coupled to the magnet core 140.

The filter member 120 includes a circumference 121 covering an outer surface of a lower side of the magnet core 140 and a boss 125 located at a center of an inside of the magnet core 140 and integrally formed with the circumference 121 to be inserted into the inside of the magnet core 140 through an opening of the lower end of the valve seat 150.

The circumference 121 accommodates a lower portion of the magnet core 140 therein, and an outer surface of the circumference 121 is supported by an inner surface of the bore 111 of the modulator block 100.

A connecting path 126 through which the orifice 151 communicates with a discharge path 113 is formed to pass through a center of the boss 125, and a plunger valve seat 127 is formed at a lower end of the connecting path 126 and has a diameter greater than that of the connecting path 126 located above the plunger valve seat 127.

The plunger valve seat 127 includes a horizontal surface 127a horizontally extending from the lower end of the connecting path 126 and an inclined surface 127b inclined downward such that a width thereof increases in a downward direction from an edge of the horizontal surface 127a.

A first filter 121a configured to filter oil introduced toward a radial direction path 142 formed between the filter member 120 and a lower end of the magnet core 140 through an inlet path 112 of the modulator block 110 is provided at the circumference 121 of the filter member 120, and a second filter 121b configured to filter out a foreign material of the oil discharged toward the discharge path 113 is provided at a lower end of the filter member 120. The first and second filters 121a and 121b are provided at locations respectively facing the inlet path 112 and the discharge path 113.

A plunger valve 200 is positioned in an inner space of the plunger valve seat 127 to be vertically moved due to a pressure of supplied oil.

The plunger valve 200 may be formed with a sealing portion 200a, formed in a hemisphere shape, provided at an upper end of plunger valve 200 and configured to come into contact with the plunger valve seat 127 when the plunger valve 200 is moved upward due to the pressure of the supplied oil, and a cylinder 200b located below the sealing portion 200a, and have a cross section having an arch shape.

A vertical hole 201 is formed to vertically longitudinally pass through a center of the plunger valve 200, and the vertical hole 201 causes the connecting path 126 to continuously communicate with the discharge path 113.

When the plunger valve 200 is moved upward due to the pressure of the supplied oil, and the sealing portion 200a comes into contact with the plunger valve seat 127 as illustrated in FIG. 3, the plunger valve 200 allows the oil to flow through only the vertical hole 201, and when the plunger valve 200 is moved downward, and the sealing portion 200a is separated from the plunger valve seat 127 as illustrated in FIG. 2, the plunger valve 200 allows the oil to flow through a gap between the plunger valve 200 and the plunger valve seat 127 and the vertical hole 201.

The plunger 160 is installed to vertically move in the through hole 141 above the valve seat 150. The plunger 160 includes the opening and closing part 161 located at a lower end of the plunger 160 and configured to open and close the orifice 151. In addition, the plunger 160 is pressed against the armature 180 by the returning spring 190 to open the orifice 151 when power is not supplied to the exciter coil assembly (not shown). Here, a step 165 stepped inward to support one end of the returning spring 190 is provided at an outer surface of an upper side of the plunger 160 such that the returning spring 190 is stably installed and supplies an elastic force to the plunger 160. Here, since the spring support step 145 having a step type for supporting the other end of the returning spring 190 is provided at the through hole 141 of the magnet core 140 as described above, the lower end of the returning spring 190 is supported by the spring support step 145 and the upper end thereof is supported by the step 165 of the outer surface of the plunger 160.

The sleeve 170 has a cylindrical form and is coupled to an outer surface of the magnet core 140.

The sleeve 170 includes a dome type closing part 171 provided at an upper portion of the sleeve 170 to close an upper portion of the magnet core 140.

The armature 180 is installed to be positioned in an inside of an upper side of the sleeve 170, that is, an inside of the dome type closing part 171, and be vertically movable.

The armature 180 moves and presses the plunger 160 to cause the orifice 151 to be closed when power is supplied to the exciter coil assembly (not shown).

Hereinafter, opening and closing operations of the solenoid valve for a brake system during braking will be described.

As illustrated in FIG. 2, when power is not supplied to the exciter coil assembly (not shown), since the returning spring 190 pushes the plunger 160 toward the armature 180, the opening and closing part 161 of the plunger 160 is separated from the orifice 151, and thus a state in which the orifice 151 opens is maintained. Accordingly, oil introduced through the inlet path 112 flows toward the discharge path 113 through the radial direction path 142, the valve-seat installation portion 147 below the through hole 141, the orifice 151, the connecting path 126, a gap formed by the oil pressing and moving the plunger valve 200 downward and located between the plunger valve seat 127 and the plunger valve 200, and the vertical hole 201.

As is apparent from the above description, since a solenoid valve for a brake system according to the embodiments of the present disclosure can secure a large amount of oil during braking, braking responsiveness can be improved.

The specific embodiments have been illustrated and described above. However, the present disclosure is not limited in the above-described embodiments and may be variously changed without limitation by those skilled in the art without departing from the gist of the technical sprit described in the appended claims.

What is claimed is:

1. A solenoid valve for a brake system comprising:
    a filter member accommodated in a bore of a modulator block including an inlet path and a discharge path;
    a magnet core coupled to the filter member and including a through hole longitudinally passing through the magnet core;
    a sleeve coupled to an outer surface of the magnet core;
    an armature installed in the sleeve;
    a valve seat fixed to the through hole and including an orifice;
    a plunger disposed at the through hole to open and close the orifice while vertically being moved by movement of the armature; and
    a returning spring configured to press the plunger against the armature,
    wherein a boss inserted into the valve seat through an opening of a lower end of the filter member and including a connecting path configured to cause the orifice to communicate with the discharge path is formed to pass through a center of the filter member, a plunger valve vertically, moved due to a pressure of supplied oil and including a vertical hole formed to pass through a center of the plunger valve is disposed below the connecting path, and a plunger valve seat having a diameter greater than that of a diameter of the connecting path is provided at a lower end of the connecting path to selectively come into contact with an outer surface of the plunger valve when the plunger valve vertically moves.

2. The solenoid valve of claim 1, wherein a width of the plunger valve seat gradually increases in a downward direction.

3. The solenoid valve of claim 1, wherein the plunger valve seat has a size to accommodate the plunger valve and a corn shape including a horizontal surface horizontally extending from a lower end of the connecting path and an inclined surface inclined downward from an edge of the horizontal surface.

4. The solenoid valve of claim 3, wherein the plunger valve includes a sealing portion configured to come into contact with the inclined surface when the plunger valve is moved upward due to the pressure of the supplied oil.

5. The solenoid valve of claim 3, wherein, when the plunger valve is moved downward and separated from the plunger valve seat, the oil is allowed to flow through the vertical hole and a gap between the plunger valve and the plunger valve seat.

6. The solenoid valve of claim 3, wherein, when the plunger valve is moved upward and comes into contact with the plunger valve seat, the oil is allowed to flow through only the vertical hole.

7. The solenoid valve of claim 1, wherein:
    the filter member covers an outer surface of a lower side of the magnet core; and
    the outer surface includes a circumference coupled to the bore.

8. The solenoid valve of claim 7, wherein:
    a first filter configured to filter oil introduced into a flow path formed between the filter member and a lower end of the magnet core through the inlet path is provided at the circumference of the filter member; and
    a second filter configured to filter oil discharged toward the discharge path is provided at the lower end of the filter member.

9. The solenoid valve of claim 1, wherein the vertical hole causes the connecting path to continuously communicate with the discharge path.

10. The solenoid valve of claim 3, wherein the plunger valve is formed with a sealing portion formed in a hemisphere shape and configured to come into contact with the inclined surface when the plunger valve is moved upward due to the pressure of the oil, and a cylinder located below the sealing portion, and has a cross section having an arch shape.

* * * * *